Patented June 13, 1950

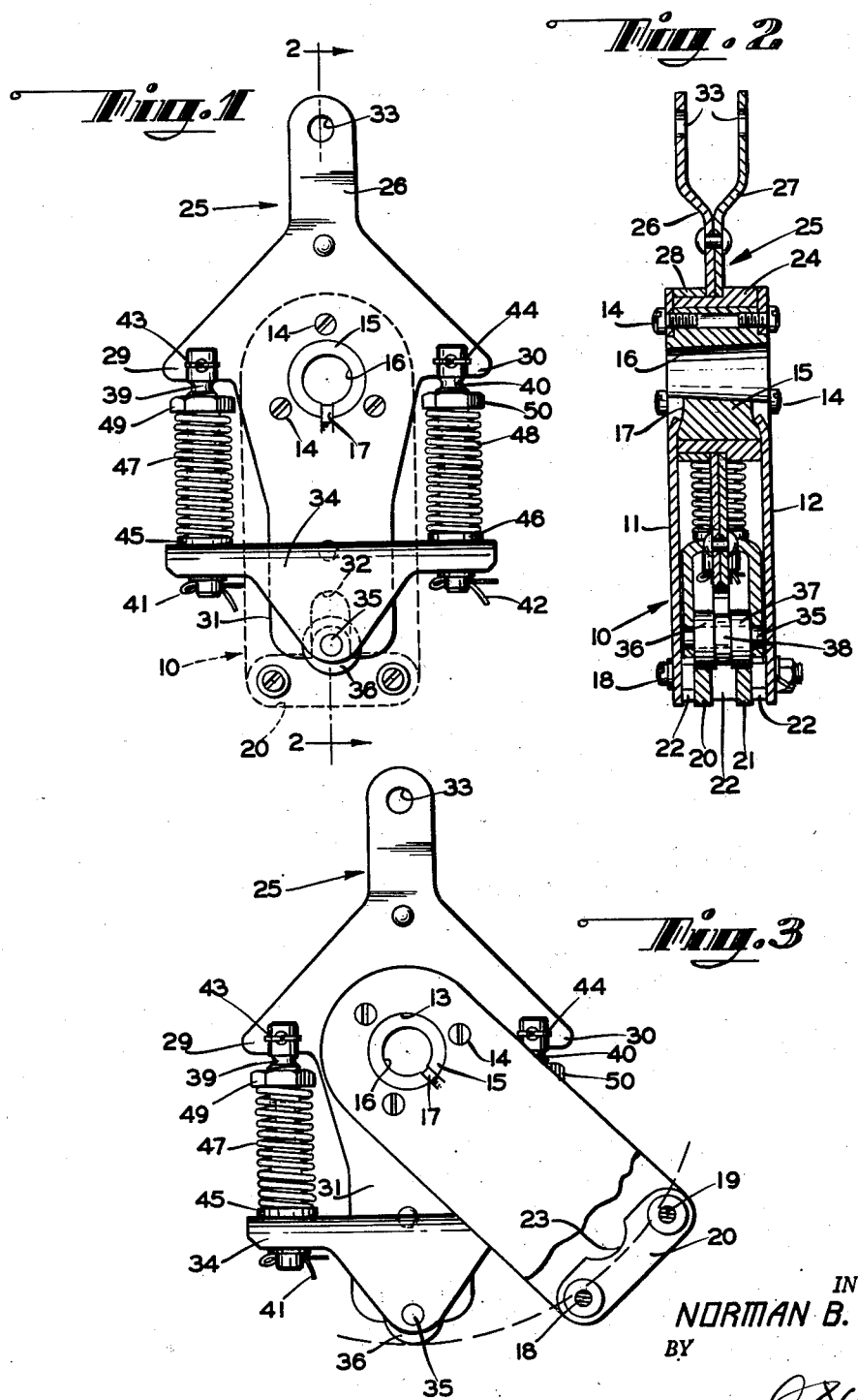

2,511,734

UNITED STATES PATENT OFFICE 2,511,734

OVERLOAD RELEASE DEVICE

Norman Barry Murphy, West Englewood, N. J., assignor to Bendix Aviation Corporation, Teterboro, N. J., a corporation of Delaware Application January 30, 1948, Serial No. 5,379

7 Claims. (Cl. 74—469)

This invention relates generally to releasable couplings insertable between a driving and driven element and more particularly to an emergency overload device which, in response to a predetermined force applied thereon, will discontinue, for example, a driving connection between a driving motor and a controlled element.

In many applications where a driving motor operates a controlled element, it is desirable to provide a manual overpowering control for disconnecting the motor from its controlled element, in the event of motor failure or for some other reason, and for operating the controlled element manually. This is particularly true in aircraft where the controlled element, which may be a rudder, aileron or elevator surface or the butterfly valve of a carburetor, for example, and its driving motor are located in some part of the craft remote from and unavailable to the human pilot. While numerous disconnect devices have been proposed heretofore which serve their purpose well, they are nevertheless subject to certain undesirable limitations which have been overcome by the novel overload release device of the present invention.

An object of the present invention, therefore, is to provide a novel overload device for use between a driving and driven element which normally defines a positive driving connection between the two elements and which, in response to the application of a predetermined force thereon, immediately discontinues the driving connection between the two elements.

Another object of the invention is to provide a novel overload release coupling constituting a driving lever provided with a detent and a driven arm having yieldably connected thereto a slidable bracket supporting a roller thereon which, when the roller and detent are aligned, is yieldably urged into registry with the detent to thereby provide a positive driving connection between the lever and the arm, the arm being adapted for rotary motion relative to the lever so that upon misalignment of the detent and roller due to relative motion between the lever and arm resulting from a predetermined force applied to the arm the driving connection is destroyed and the roller is yieldably maintained out of registry with the detent so that the arm may be actuated manually to operate a controlled element independently of the lever.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

In the drawings wherein like reference characters refer to like parts, throughout the several views:

Figure 1 is a side elevation view of the novel overload release device of the present invention in an engaged position;

Figure 2 is a sectional view taken substantially along line 2—2 of Figure 1; and, Figure 3 is a view similar to that of Figure 1 with the overload device in an uncoupled condition.

Referring now to the drawing for a more detailed description of the novel overload release device of the present invention, the latter is shown as comprising a driving lever 10 (shown in phantom in Figure 1) consisting of two spaced parallel plates 11 and 12 (Figure 2) which at their upper ends are provided with aligned apertures 13 and are fastened to each other by way of suitable means such as screws 14 through a cylindrical adaptor 15, forced into apertures 13. Adaptor 15 is provided with a central conical recess or opening 16 formed therein adapting the lever 10 for connection to the shaft of a suitable driving motor, such connection being defined by either forcing the adaptor on to the shaft or by providing the shaft with a key for cooperation with a slot or keyway 17 formed in the adaptor.

The opposite or lower ends of plates 11 and 12 support therebetween, by way of bolts 18 and 19, detent means in the form of a block defined by a pair of parallel transverse plates 20 and 21 which are spaced from each other and from the plates 11 and 12 by way of annular spacer discs 22 sleeved about bolts 17 and 18. Aligned channels or slots 23, are, moreover, formed in each of plates 20 and 21 for a purpose to presently appear.

Sleeved about adaptor 15 is an annular bushing 24 provided with a stepped down outer periphery for accommodating thereon a driven arm 25 comprising a pair of parallel plates 26 and 27 fastened to each other and provided with suitable apertures for assembly on the bushing 24. An annular retainer disc 28 is further provided between the driven arm and the plate 11 of the driving lever as shown in Figure 2 whereby rotary motion of arm 25 together with bushing 24 and disc 28 may be effected relative to adaptor 15 and intermediate plates 11 and 12.

Plates 26 and 27, moreover, are formed with two oppositely divergent arms 29 and 30 (Figure 3) and a lower reduced body portion 31 formed with a slot 32 while at their upper ends they are bent outwardly and upwardly and are provided with apertures 33 for the reception of two cables, one leading to any desired element to be controlled which may be, for purposes of illustration only, an aircraft control surface or the butterfly valve of a carburetor and the other to the pilot's manual control for the surface or the throttle. The arrangement may also take the form of a single cable between the controlled element and the manual control and a second cable between the controlled element and the overload device hereof. With the latter arrangement, the manual control will follow motor operation and when the coupling device is overpowered manually the driven arm will follow operation of the manual control.

Slidably mounted on the reduced portion 31 of the driven arm is a bracket member 34 which is centrally apertured to this end and which comprises two spaced parallel side pieces having suitably journalled therein a transverse shaft 35 which mounts thereon two rollers 36 and 37 having interposed therebetween a smaller roller 38 which is adapted for cooperation with slot 32 of the driven arm in a manner and for a purpose to presently appear.

Bracket member 34 is mounted for reciprocal or slidable motion relative to driven arm 25 by way of two bolts 39 and 40 which pass through bracket 34, suitable means such as cotter pins 41 and 42, for example, being provided on the ends of the bolts to maintain the bracket assembled thereon, and to divergent arms 29 and 30 of the driven arm by way of suitable means such as cotter pins 43 and 44 which pass through the two arms as well as the heads of bolts 39 and 40, the latter being bifurcated for this purpose. Sleeved about bolts 39 and 40 are cylindrical members 45 and 46 having shoulder portions on which rest the lower ends of springs 47 and 48, the upper ends of the springs resting against adjustable nuts 49 and 50, the load on the springs being determined by the position of the adjustment nuts.

It will now be apparent to those skilled in the art, that upon alignment of slots 23 of the detent means 20 and 21 with the rollers 36 and 37, springs 47 and 48 will urge bracket 34 downwardly to bring the rollers into registry with the detent means in the manner shown in Figures 1 and 2 to thereby define a positive and desirable driving connection between driving lever 10 and driven arm 25. Driven arm 25 in this manner is caused to faithfully follow rotary motion of driving lever 10 to impart the control action of a prime mover actuating lever 10 to a controlled element connected to the driven arm.

Where, for some reason, the prime mover fails, and it is desired to disconnect the prime mover from the driven arm and the controlled element and to place the latter under manual control, it is only necessary on the part of the operator to apply manual force to the cable connected to the driven arm to release the latter from the driving lever. By applying such force manually to the driven arm, rollers 36 and 37 are caused to ride out of slots 23 of the detent means causing bracket 34 to retract relative to driven arm 25 against the action of springs 47 and 48, intermediate roller 38 travelling in slot 32 of the driven arm to guide the retracting motion of the bracket. As soon as rollers 36 and 37 pass beyond either end of transverse plates 20, 21 of the detent means, springs 47 and 48 extend bracket 34 outwardly so that rollers 36 and 37 will be maintained out of registry with the detent means so that the driving coupling between lever 10 and arm 25 is discontinued and maintained discontinued.

It is to be understood that in the event the degree of manual control required for operating the controlled element exceeds the angular limit defined by the position of driving arm 10, sufficient force need only be applied to cause rollers 36 and 37 to ride up the ends of transverse plates 20 and 21 at which time bracket 34 will again be retracted relative to arm 25 until the rollers register with the slots 23 of the detent means. At this point the rollers will be in registry with the detent means whereupon bracket 34 will be extended to maintain such registry. In this manner, the driving connection may be re-established or, if desired, the application of manual force may be continued until the rollers pass out of the detent means to a point beyond the opposite ends of transverse plates 20 and 21. From this point, manual control of the controlled element may be carried on independently of the driving arm.

While the novel overload release device of the present invention has been described in connection with its releasable action when the motor has failed, it is to be understood that it is operable in the same manner where it may be desired to uncouple the driving connection even though the motor may be operating the driving lever.

Although but a single embodiment of the present invention has been illustrated and described in detail, it is to be expressly understood that the invention is not limited thereto. Various changes may be made in the design and arrangement of the parts without departing from the spirit and scope of the invention, as will now be understood by those skilled in the art.

I claim:

1. A releasable driving connection for use between a driving and driven element comprising a driving lever adapted for connection to the driving element, a driven arm adapted for connection to said driven element and coaxially mounted with the driving lever, an apertured bracket, means supporting said bracket on said arm for extensible and retractible motion relative to said arm, said bracket substantially surrounding said arm by way of its aperture, yieldable means interposed between said bracket and said arm for normally extending said bracket relative to said arm, and registering means carried by said lever and said bracket for establishing a driving connection between said driving and driven elements when said bracket is in said extended position.

2. A releasable driving connection for use between a driving and driven element comprising a lever adapted for connection to the driving element, a detent device supported by said lever, a driven arm adapted for connection to said driven element and coaxially mounted with the lever, an apertured bracket, means supporting said bracket on said arm for extensible and retractible motion relative to said arm, said bracket substantially surrounding said arm by way of its aperture, yieldable means interposed between said bracket and said arm for normally extending said bracket relative to said arm, and means carried by said bracket for engagement with said detent to thereby define a drivable connection between said lever and said arm when said bracket is in said extended position.

3. A releasable driving connection for use between a driving and driven element comprising a lever adapted for connection to the driving element, a detent device supported by said lever, a driven arm adapted for connection to said driven element and coaxially mounted with the lever, an apertured bracket surrounding said arm, means supporting said bracket for extensible and retractible motion relative to said arm, yieldable means between said arm and said bracket and sleeved about said supporting member for normally extending said bracket relative to said arm, and means carried by said bracket for engagement with said detent to thereby define a drivable connection between said lever and said arm.

4. A releasable driving connection for use between a driving and driven element constituting a lever comprising a pair of spaced parallel plates adapted for connection to the driving element, a detent block supported between said plates, a driven arm adapted for connection to said driven element and coaxially mounted with the lever between the two plates thereof, an apertured bracket, means supporting said bracket on said arm for extensible and retractible motion relative to said arm, said bracket substantially surrounding said arm by way of its aperture, yieldable means between said arm and bracket for normally extending the latter longitudinally of said arm, and means carried by said bracket for engagement with said detent to thereby define a drivable connection between said lever and said arm.

5. In combination, a rotatable driving lever, detent means carried by said lever, a rotatable driven arm coaxial with said lever and adapted for rotation relative thereto, a bracket, means slidably mounting said bracket on said arm for extensible and retractible motion relative to said arm, a roller carried by said bracket adapted for cooperation with said detent means when the roller and detent means are aligned to thereby define a positive driving connection between said lever and arm which is releasable when relative motion occurs between said lever and said arm resulting from the application of a predetermined load on said arm, and yieldable means between said arm and said bracket and associated with said mounting means for extending the roller into registry with said detent means when said roller is aligned with said detent means and for maintaining said roller out of registry with said detent means when said roller and detent means have been misaligned by relative motion of said arm and lever.

6. In combination, a rotatable driving lever comprising a pair of spaced parallel plates, detent means supported between said plates, a rotatable driven arm coaxial with said lever and adapted for motion relative thereto arranged between said plates, a bracket, means slidably mounting said bracket on said arm for extensible and retractible motion relative to said arm, a roller carried by said bracket adapted for cooperation with said detent means when the roller and detent are aligned to thereby define a positive driving connection between said lever and arm which is releasable when relative motion occurs between said lever and said arm resulting from the application of a predetermined load on said arm, and yieldable means between said arm and said bracket and surrounding said mounting means for extending the roller into registry with said detent means when said roller is aligned with said detent means and for maintaining said roller out of registry with said detent means when said roller and detent means have been misaligned by relative motion of said arm and lever.

7. In combination, a rotatable driving lever, a rotatable driven arm coaxial with said lever and adapted for rotation relative thereto, a bracket, means slidably mounting said bracket on said arm for extensible and retractible motion relative to said arm, registering means supported by said lever and said bracket which when brought into registry upon the occurrence of a predetermined relation between said lever and said arm define a drivable connection between said lever and said arm which is releasable when said registering means are brought out of registry upon the occurrence of relative motion between said lever and said arm resulting from the application of a predetermined load on said arm, and yieldable means between said arm and said bracket and sleeved about said mounting means for bringing said registering means into registry when said lever and said arm are in said predetermined relation and for maintaining said registering means out of registry when relative motion occurs between said lever and said arm.

NORMAN BARRY MURPHY.

REFERENCES CITED

The following references are of record in the file of this patent:

UNITED STATES PATENTS

| Number | Name | Date |
| --- | --- | --- |
| 983,800 | Baker | Feb. 7, 1911 |
| 1,067,034 | Keller | July 8, 1913 |
| 2,161,732 | Von Manteuffel | June 6, 1939 |
| 2,237,719 | Tiebel | Apr. 8, 1941 |